United States Patent
Guy et al.

(10) Patent No.: US 8,275,768 B2
(45) Date of Patent: Sep. 25, 2012

(54) METHOD AND SYSTEM FOR SELECTING A COMMUNICATION MEANS

(75) Inventors: Ido Guy, Haifa (IL); Boaz Mizrachi, Haifa (IL); Eyal Sonsino, Haifa (IL); Vladimir Soroka, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 12/025,069

(22) Filed: Feb. 4, 2008

(65) Prior Publication Data

US 2009/0198652 A1    Aug. 6, 2009

(51) Int. Cl.
*G06F 7/00* (2006.01)
*G06F 17/30* (2006.01)
(52) U.S. Cl. .................. 707/732; 707/751; 707/922
(58) Field of Classification Search .................. 707/732, 707/751, 922
See application file for complete search history.

(56) References Cited

U.S. PATENT DOCUMENTS

| | | | | |
|---|---|---|---|---|
| 7,139,827 B1* | 11/2006 | Iwayama et al. | ............. | 709/227 |
| 7,343,365 B2* | 3/2008 | Farnham et al. | ............. | 715/853 |
| 2005/0281276 A1 | 12/2005 | West et al. | | |
| 2007/0143472 A1 | 6/2007 | Clark et al. | | |
| 2007/0203991 A1* | 8/2007 | Fisher et al. | ............. | 709/206 |
| 2007/0290787 A1* | 12/2007 | Fiatal et al. | ............. | 340/2.1 |

OTHER PUBLICATIONS

M. Grohn et al., "Visualizing human communication in business process simulations" Proceedings of the 1999 Visual Data Exploration and Analysis VI, Jan. 27-28, 1999.
J. Wijayanayake et al., "Communication media choice by workers in distributed environment", Information and Management, v 36, n 6, Dec. 1999, p. 329-338.

* cited by examiner

*Primary Examiner* — Mariela Reyes (57) ABSTRACT

A method and system for selecting communication means are provided. The method includes receiving a request for communication (102) by a current user (101) with a target contact and searching data of prior communication attempts (105) by prior users with one or more prior target contacts using different communication means, wherein the current user and the prior users fall within a first defined category and the target contact and the prior target contacts fall within a second defined category. The success of the communication means of prior communication attempts is determined (104) and a communication means for the current user is recommended (103). The method includes referencing (107) relationship resource (109) to determine if users or target contacts fall within defined categories, such as, for example, an organizational structure level, a department, or a group of people with a given form of relationship to another group of people.

18 Claims, 8 Drawing Sheets

| USER 1 | USER 2 | COMM. METHOD | EFFICIENCY GRADE |
|---|---|---|---|
| Fred Brown | Tina Green | Voice mail | 1 |
| Fred Brown | Tina Green | SMS | 2 |
| John White | Tina Green | email | 5 |

METHOD AND SYSTEM FOR SELECTING A COMMUNICATION MEANS

FIELD OF THE INVENTION

This invention relates to the field of communication. In particular, the invention relates to the field of selecting an appropriate communication means.

BACKGROUND OF THE INVENTION

There are times when a person needs to approach a new contact or person that they have not communicated with previously. There are many possible methods or channels for initiating a contact including using one of the communication means of email, instant messaging (IM), landline phone, cellular phone, Internet Protocol (IP) phone, scheduling a meeting, voice mail, SMS (short message service), fax, etc. It is a problem for a person to select the appropriate form of communication means for a particular contact.

Known systems enable a prospective contact to state a preferred contact method in an online directory. A problem is that this field should be filled manually and this may not have been done by the contact and the field may not default to the most appropriate contact method.

Moreover, the appropriate contact method can be different depending on the person who is trying to initiate the contact. For instance, the Vice President of a company may call directly the Chief Executive Officer (CEO), while engineers should write an email to the CEO's assistant. There are two factors which should be considered when choosing the best method for communication: the fastest and most efficient available method; and the appropriate, socially acceptable method.

Choosing the wrong method may impose unnecessary delay which could have been avoided or may result in an unwelcome interruption for the recipient. For example, a call directly to a CEO's cell phone is usually not the desirable, socially accepted and effective method.

Recently, rich presence oriented methods for call routing have been introduced in which a person's availability and the preferred number to call is identified using various forms of presence information, such as location, device availability, caller and callee identities, etc. Such methods require users to manage groups of contacts manually along with the contact method and availability preferences, which becomes a drawback.

SUMMARY OF THE INVENTION

According to a first aspect of the present invention there is provided a method for selecting communication means, comprising: receiving a request by a current user for a recommended communication means for a target contact; searching data of prior communication attempts by prior users with one or more prior target contacts using different communication means, wherein the current user and the prior users fall within a first defined category and the target contact and the prior target contacts fall within a second defined category; determining the success of the communication means of prior communication attempts; and providing a recommended communication means for the current user.

In one embodiment, the second defined category includes only the target contact and searching data of prior communication attempts, searches data of prior communication attempts with the same target contact by prior users using different communication means. In another embodiment, the first defined category includes only the current user and searching data of prior communication attempts, searches data of prior communication attempts of the current user with contacts within the second defined category which are similar to the target contact.

The method may include collecting data of prior communication attempts by prior users to prior target contacts by monitoring communication logs and automatically grading the efficiency of a communication attempt. Automatically grading the efficiency of a communication attempt may evaluate parameters including one or more of a speed of communication response, length of communication, or the number of failed communication attempts.

Alternatively, the method may include collecting data of prior communication attempts by prior users to prior target contacts by prior user input indicating the success of a communication attempt. A prior user may input data of prior communication attempts online to be accessible via a network.

The method may include referencing resources via a network to determine defined categories of users and targets. For example, the method may reference an organizational structure to determine if prior users or prior target contacts fall within defined organizational categories.

A defined category may be one of an organizational structure level, a department, a group of people with a given form of relationship to another group of people, a group of people belonging to a social network for a user.

Providing a recommended communication means may include providing a rated selection of communication means to the current user. The communication means may include email, instant messaging (IM), landline telephone, cellular telephone, Internet protocol (IP) telephone, voicemail, short message service (SMS), fax, scheduled meeting.

According to a second aspect of the present invention there is provided a system for selecting communication means, including a data processor comprising: an interface for receiving a request by a current user for a recommended communication means for a target contact; a data analyzer for searching data of prior communication attempts by prior users with one or more prior target contacts using different communication means, wherein the current user and the prior users fall within a first defined category and the target contact and the prior target contacts fall within a second defined category, wherein the data includes an indication of the success of the communication means of prior communication attempts; and means for recommending a communication means for the current user.

The system may further include resources accessible via a network for defining categories of users and targets, a data collector for collecting data of prior communication attempts by prior users to prior target contacts by monitoring communication logs, and a communication attempt evaluator for automatically grading the efficiency of a communication attempt.

The communication attempt evaluator may evaluate parameters including one or more of a speed of communication response, length of communication, or the number of failed communication attempts.

In one embodiment, the data collector includes a monitoring system provided at a client communication means for logging data to a server. In an alternative embodiment, the data collector includes a monitoring system provided at a communication server for logging data. In a further alternative embodiment, a data collector for collecting data of prior communication attempts by prior users to prior target contacts includes a user interface for manual input by users indicating the success of a communication attempt. The user interface for manual input by users may be an online data input means accessible via a network.

According to a third aspect of the present invention there is provided a computer software product for selecting communication means, the product comprising a computer-readable storage medium, storing a computer in which program comprising computer-executable instructions are stored, which instructions, when read executed by a computer perform the steps of: receiving a request by a current user for a recommended communication means for a target contact; searching data of prior communication attempts by prior users with one or more prior target contacts using different communication means, wherein the current user and the prior users fall within a first defined category and the target contact and the prior target contacts fall within a second defined category; determining the success of the communication means of prior communication attempts; and providing a recommended communication means for the current user.

According to a fourth aspect of the present invention here is provided a method of providing a service to a customer over a network, the service comprising: receiving a request by a customer in the form of a current user for a recommended communication means for a target contact; searching data of prior communication attempts by prior users with one or more prior target contacts using different communication means, wherein the current user and the prior users fall within a first defined category and the target contact and the prior target contacts fall within a second defined category; determining the success of the communication means of prior communication attempts; and providing a recommended communication means for the current user.

Applying such a solution within an organization may facilitate the process of finding the appropriate contact method by a communication means, and can make communication more efficient.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
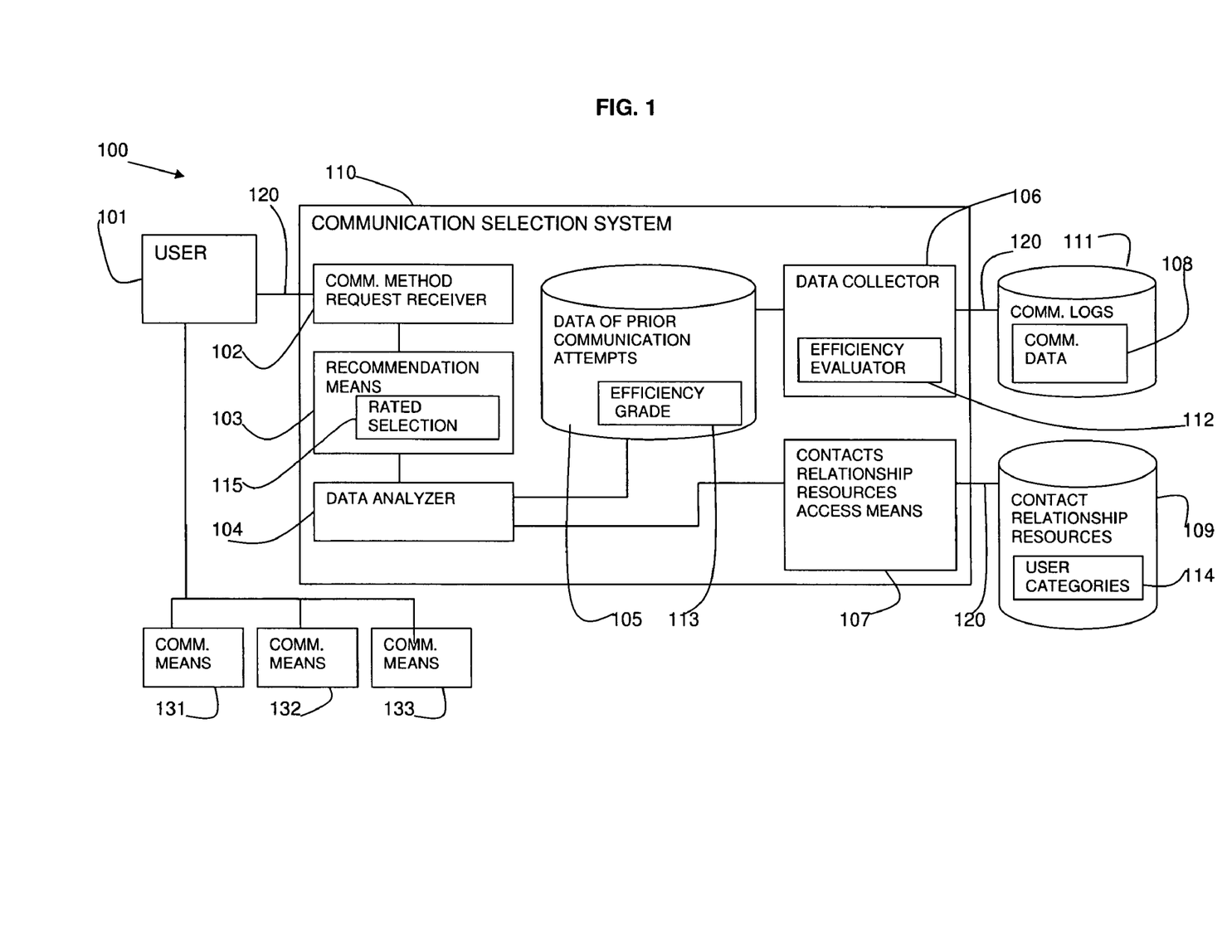
FIG. 1 is block diagram of a system in accordance with the present invention.

Referring to FIG. 1, a system 100 is provided for selecting the appropriate communication means 131-133 for a user 101 to initiate communication with a target contact. The system 100 includes a communication selection system 110 which includes a receiver 102 for a communication method request from the user 101. In one embodiment, the receiver 102 for a communication method request is a graphical user interface (GUI) or other input mechanism for access to the selection system 110 by a user 101. The user 101 may access the selection system 110 via a network 120.

The selection system 110 includes a data collector 106 for collecting data relating to prior communication attempts 108. The data collector 106 may collect data from communication logs 111 of communication means. The data may relate to successful and unsuccessful communication attempts. The collected data 105 may be stored externally to the selection system 110 for example in a database accessible via a network, or in storage coupled to the selection system 110 itself.

The data collector 106 includes an efficiency evaluator 112 for determining the efficiency or success of prior communication attempts and for grading the efficiency of the prior communication attempts between different users and contacts. The efficiency evaluator, which may also be referred to as a communication attempt evaluator, evaluates parameters including one or more of a speed of communication response, length of communication, or the number of failed communication attempts. The collected data 105 includes the type of communication means used in the prior attempt, the contact initiator and the contact receiver as well as the efficiency grade 113 for an attempt. The collected data 105, including the efficiency grade 113, is used by a data analyzer 104 of the selection system 110.

The selection system 110 includes a contact relationship access means 107 for accessing contact relationship resources 109 such as hierarchical organizational data structures or databases of contacts seniority, position level, job description, qualification, etc. The relationship resources 109 may be accessed from resource locations via a network 120. The relationship resources 109 include defined categories 114 for similar groups of users and contacts. These resources 109, as retrieved by the access means 107, are also used by the data analyzer 104.

The data analyzer 104 analyses the data of prior communication attempts 105 with reference to the relationship resources 109 for user and/or contact categories.

The selection system 110 also includes a recommendation means 103 which evaluates a communication method request from a user 101 in view of the data analysis carried out by the data analyzer 104 with reference to the data relating to previous communications 105 and the contact relationship resources 109. The recommendation means 103 may provide a selection 115 of possible communication means 131-133 for use by a user with efficiency ratings.

In one embodiment, the selection system 110 includes an interface to communication means 131-133 to initiate a communication with the target contact once the communication means 131-133 has been selected.

The selection system 110 leverages information about previous communication attempts between similar people. This is illustrated with reference to FIG. 2 which shows an example contact relationship resource in the form of a tree organizational structure 200, with a CEO, President, or other most senior figure 201 at the top of the organizational structure 200. The organizational structure 200 has a first level 210 below the most senior figure 201 and a second level 220 below the first level 210. The first level 210 includes three people 202, 203, 204 who may report directly to the most senior figure 201. The second level 220 includes three people 205, 206, 207 who report directly to one of the people in the first level 210.

Figure 2:
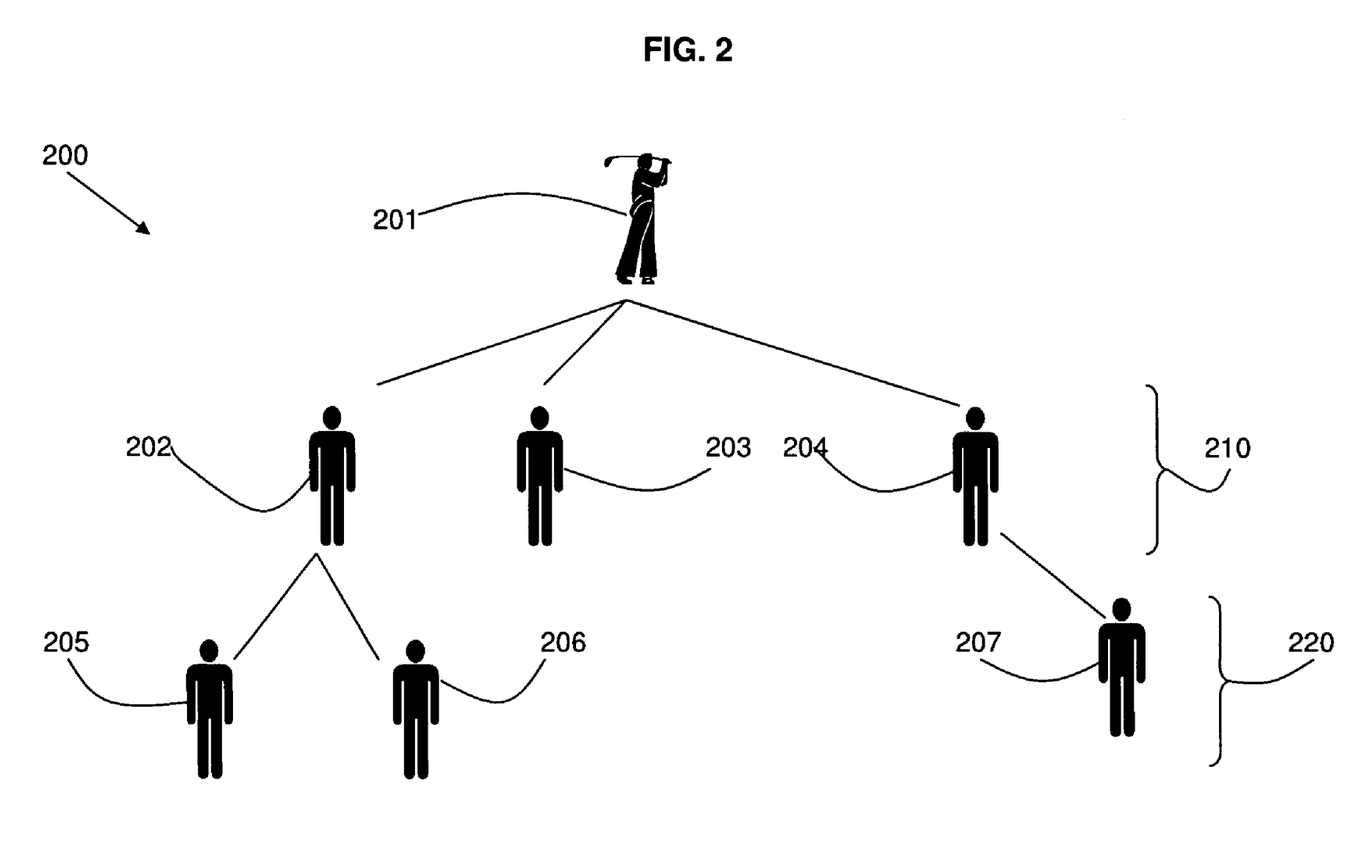
FIG. 2 is a schematic representation of an organizational data structure used in accordance with the present invention.

If a person 205 of level 2 wishes to communicate with the most senior figure 201, it would be helpful to analyse prior communication attempts from other people 206, 207 of the same level as the person 205 to the most senior figure 201 in order to ascertain the most efficient and appropriate form of communication method. Both failed and successful prior communication attempts should be analyzed.

Similarly, if a person 205 of the second level 220 wishes to communicate with a person 203 in the first level 210, it would be helpful to analyze prior communication attempts from other people 206, 207 in the second level 220 to either the same person 203 in the first level 210 or alternative people 202, 204 in the first level 210.

This is a very simplified example structure 200 and in reality the structure 200 would be much more complex with different categories of status or position within an organization which may transcend hierarchical levels. For example, people may be categorised into groups for which similar forms of communication are appropriate. An example would be personal assistants who may not be very senior in an organization but who can communicate directly and frequently with senior figures. Therefore, the organizational structure may be categorised by relationships between members, for example, based on frequency of communication and level of importance of communications.

Figure 3:
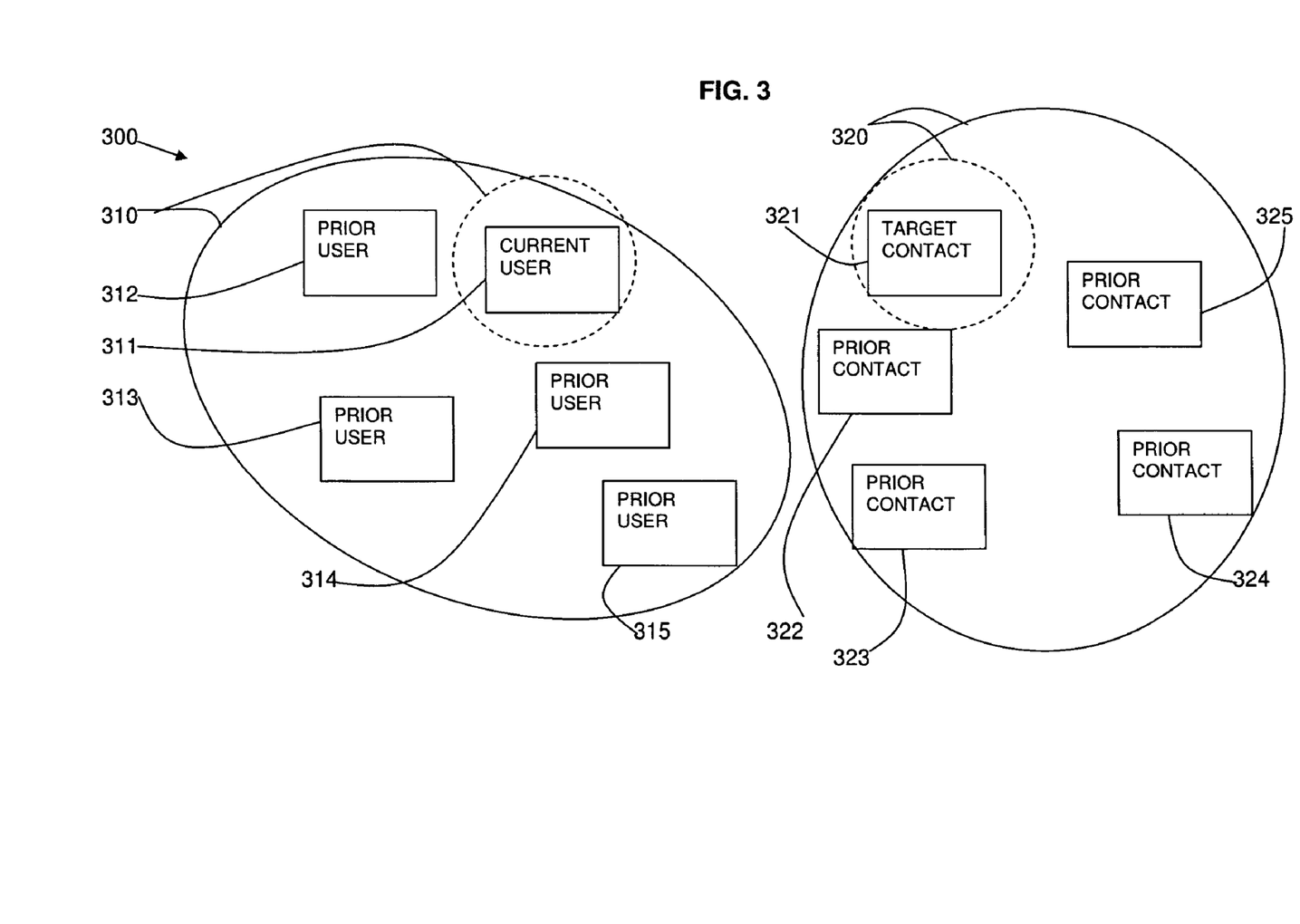
FIG. 3 is a schematic diagram showing defined categories of users and target contacts in accordance with the present invention.

Referring to FIG. 3, a schematic diagram 300 shows the use of categories defined by the relationship resources used. A user 311 is defined in a first category 310 with other prior users 312-315. A target contact 321 is defined in a second category 320 with other contacts 322-325. The first and second categories 310, 320 are each determined as a group of users 311-315, or targets 321-325 who are similar. The similarity may be, for example, a similarity in position in a company, have similar qualifications, close social contacts on a social or business network, or any other similarity measure which can be obtained from a relationship resource.

The first category 310 may be restricted (shown in hashed lines) to only the current user 311 and data relating to prior communication attempts will be restricted to attempts by only the current user 311 to targets in the second category 320. Similarly, the second category 320 may be restricted (shown in hashed lines) to only the target contact 321 and data relating to prior communication attempts will be restricted to attempts by prior users to contact only the target contact 321.

If there is extensive prior data, both the first and second categories 310, 320 may be restricted to only the current user 311 and only the target contact 321 and data relating to prior communication attempts will be restricted to attempts by the current user 311 to contact the target contact 321. Whereas, in the case where there is very little prior data, the categories could be expanded to use a wide range of prior users in the first category 310 and a wide range of target contacts in the second category 320 and data relating to all prior communication attempts between the two groups is used.

More than one relationship resource may be used to obtain the categories of similar prior users to the current user and to provide similar target contacts, if required. The multiple resources may be used in combination or different resources may be used for the user and target contact categories.

Referring back to FIG. 1, a user 101 seeks the most effective communication means to communicate with a target contact. The selection system 110 looks at data from prior communication attempts 105 by other prior users who are similar to the current user 101. The similarity between the current user 101 and prior users is based on a contact relationship resource 109 accessed by the selection system 110. Based on the history of communications, the selection system 110 will be able to recommend a communication method that has proved useful.

The selection system 110 is dynamic, as it continues to gather data using the data collector 106. The selection system 110 adapts and learns if people change their communication behaviour and can change its recommendation accordingly.

Figure 4:
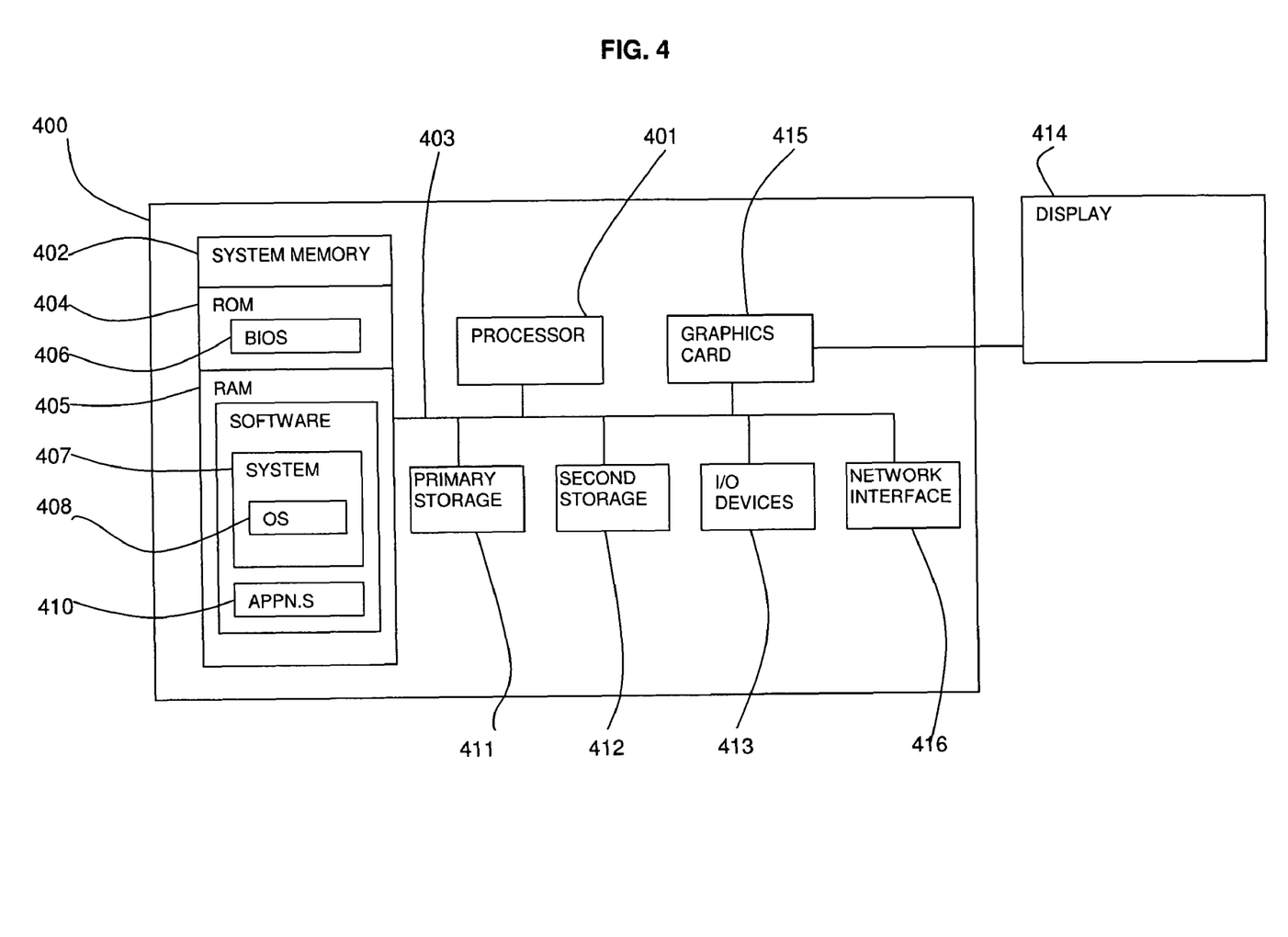
FIG. 4 is a block diagram of a computer system in which the present invention may be implemented.

Referring to FIG. 4, an exemplary system for implementing the selection system 110 includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
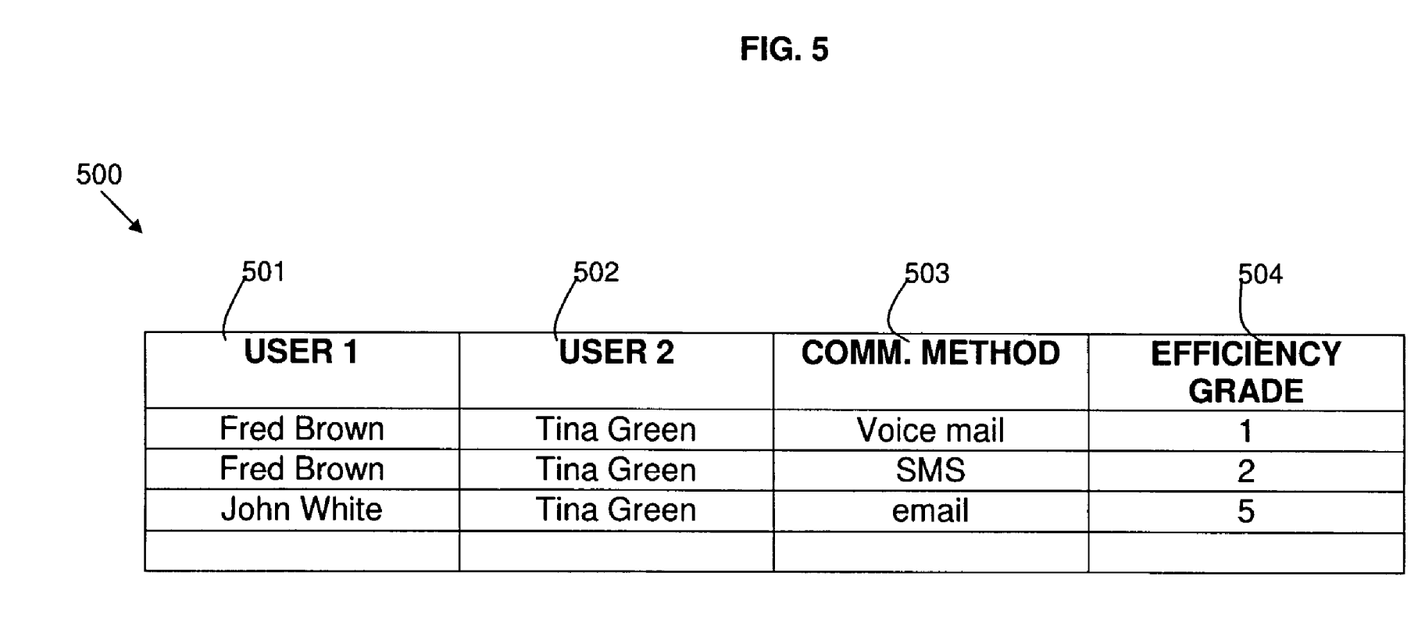
FIG. 5 is an example of prior communication data in accordance with the present invention.

Referring to FIG. 5, a table 500 illustrates an example form of the prior communication data 105 collected by the data collector 106. The table 500 shows a column for a first user 501, a column for a second user 502, a column for the communication method used 503 between the first user 501 and the second user (the target contact) 502 in a prior communication attempt, and a column for the efficiency grade 504 of the communication attempt.

In the basic example shown in FIG. 5, a first user Fred Brown has attempted to communicate with Tina Green twice, once by voice mail with very little success (grade 1 efficiency), and another time by SMS with still little success (grade 2 efficiency). John White on the other hand has attempted to communicate with Tina Green by email with high efficiency (grade 5 efficiency). If a user is of a similar category to John White in relation to Tina Green, then this data indicates that email would be the best form of communication method.

A first embodiment of how the efficiency grade can be calculated is by evaluating the time difference between the first communication attempt and the reply from the target contact. Another embodiment can take the reverse number of communication attempts (for example, the number of emails, chat messages, or phone calls) before getting a reply.

In a further embodiment, for each communication means, an average score for communication is calculated from all the attempts to communicate with a given contact using the communication means. For example, if three users tried email as the communication means and the efficiency scores or grades were 0.5, 0.6, 0.7, then the score for email will be 0.6. Similarly, scores will be calculated for other communication means and the ranking will be returned based on ranking of the scores.

Data collection for gathering data relating to prior communication attempts may be carried out by one or a combination of the following:

Collecting the information automatically based on a heuristic analysis of communication logs; and Letting users manually manage such lists and share the data with others.

In the automatic collection method, a log of communication of all available types of communication means is used to record communication among users. Once a communication attempt is logged from user A to user B, the system will estimate the efficiency of the communication method based on given parameters, for example, the speed of response and length of interaction of the communication.

Figure 6A:
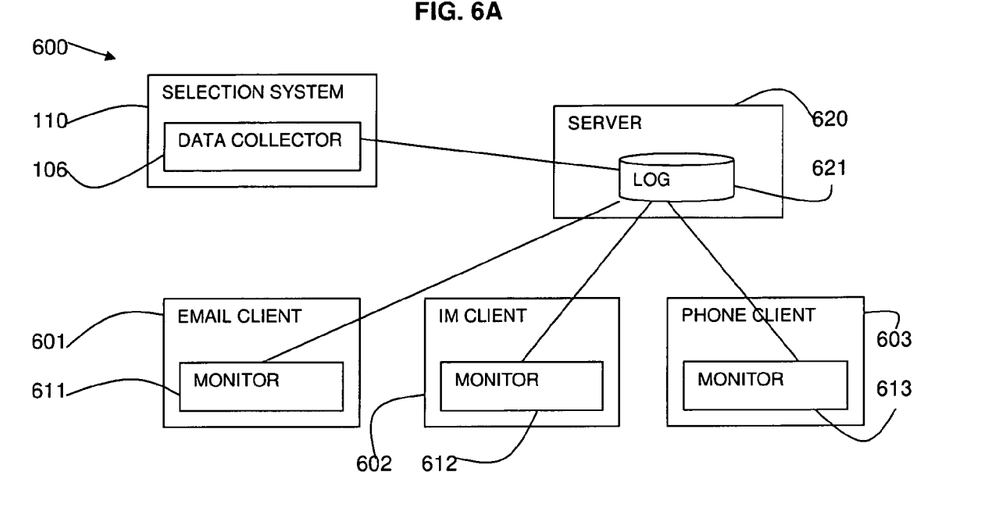
FIGS. 6A and 6B are block diagrams of two embodiments of automatic data collection in accordance with an aspect of the present invention.

A first embodiment of automatic collection can be carried out at the client communication means as shown in FIG. 6A. A second embodiment of automatic collection can be carried out at a communication means server as shown in FIG. 6B.

Referring to FIG. 6A, a system 600 is shown illustrating a first embodiment of automatic collection. The system 600 includes a monitoring system 611-613 added to each of the client applications or devices 601-603 used for communication and included in the system 600. For example, a monitoring system may be added to an email client used in an organization, an IM client, IP phones, cellular phones, etc. These monitoring systems 611-613 provide data in a general form of communications to a log 621 on a central server 620. A communication row logged into the server 620 may take the following example form: [system, source, destination, time, reply_time (nullable), content]. The data collector 106 of the selection system 110 may access the log 621 to collect data on prior communication attempts.

Figure 6B:
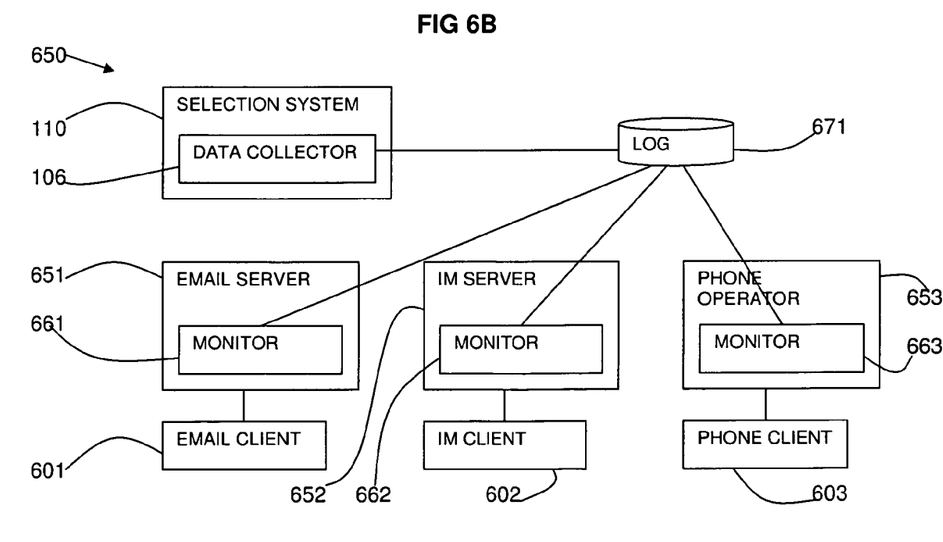

Referring to FIG. 6B, a system 650 is shown illustrating a second embodiment of automatic collection. In the system 650 of the second embodiment, the interactions of users are tracked on the server side (rather than on the client). The client applications or devices 601-603 are not changed and the servers 651-653 of the communication applications or devices, such as an email server, a cellular phone operator, etc. have monitoring systems 661-663 to gather the information on the communication attempts. The monitoring systems 661-663 may post their data relating to communication attempts to a log 671. The data collector 106 of the selection system 110 may access the log 671 to collect data on prior communication attempts.

A system may analyse all communications of a user in order to compile the previous communication attempt data. However, an alternative system may hook to the communication instruments and log the user's activity in each.

In the manual method of data collection, users manually manage lists of communication means with target contacts. Access control may be public by default, but the user is allowed to restrict it. A concept similar to that of social applications such as social bookmarking web services, for example, del.icio.us, and photo sharing web services, for example, Flickr (del.icio.us and Flickr are trade marks of Yahoo! Inc.) may be used in which users manage their own records but benefit from other's records being public. Using this method may simplify the information and hide the actual number describing the efficiency.

Figure 7:
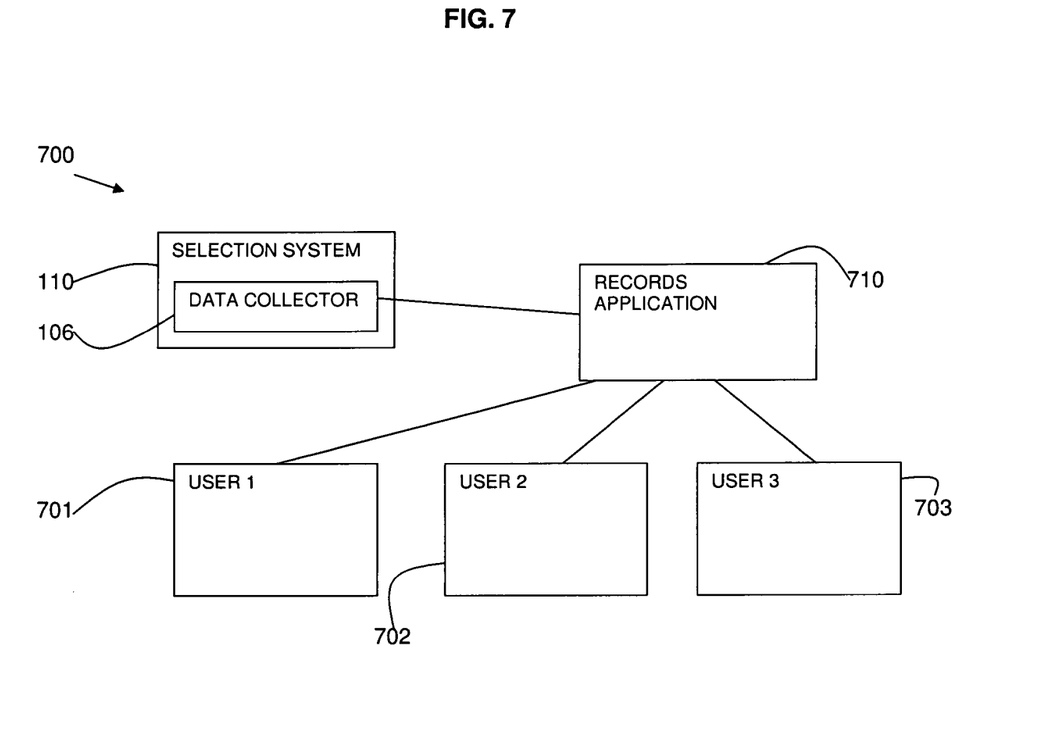
FIG. 7 is a block diagram of an embodiment of manual data collection in accordance with an aspect of the present invention.

Referring to FIG. 7, a system 700 is shown in which users 701-703 supply an online records application 710 with data relating to prior communication attempts. The records application 710 may be accessed by the data collector 106 of the selection system 110. For example, the records application may be managed in an online address book application. A line in such a system may include the following details: [destination_user, date, communication_method, score, comments]. In a simpler form, an address book can be used in which each line includes, for example: [user_name, user_email, address, phone1, phone2, fax, tags, recommended_communication_methods, non_recommended_communication_method, comments].

The user may also be allowed to narrow the recommendation obtained by a selection system to be based on social networks, which can be retrieved for a user. For example, from networking services such as business network services, for example, LinkedIn (LinkedIn is a trade mark of LinkedIn Corporation) or such as social network services, for example, Facebook (Facebook is a trade mark of Facebook, Inc.).

By default the system may issue a recommendation to the user based on other users who are found to be similar to him. However, the user can have an option to narrow the recommendation to be based only on people who he knows. The lists of people a user knows can be retrieved from social network services such as Facebook and LinkedIn. For example, if user1 has 50 friends listed in both Facebook and LinkedIn, the system can connect to these systems, retrieve the list of 50 connections and look for recommendations based on communications from these 50 users only to the target contact.

Figure 8:
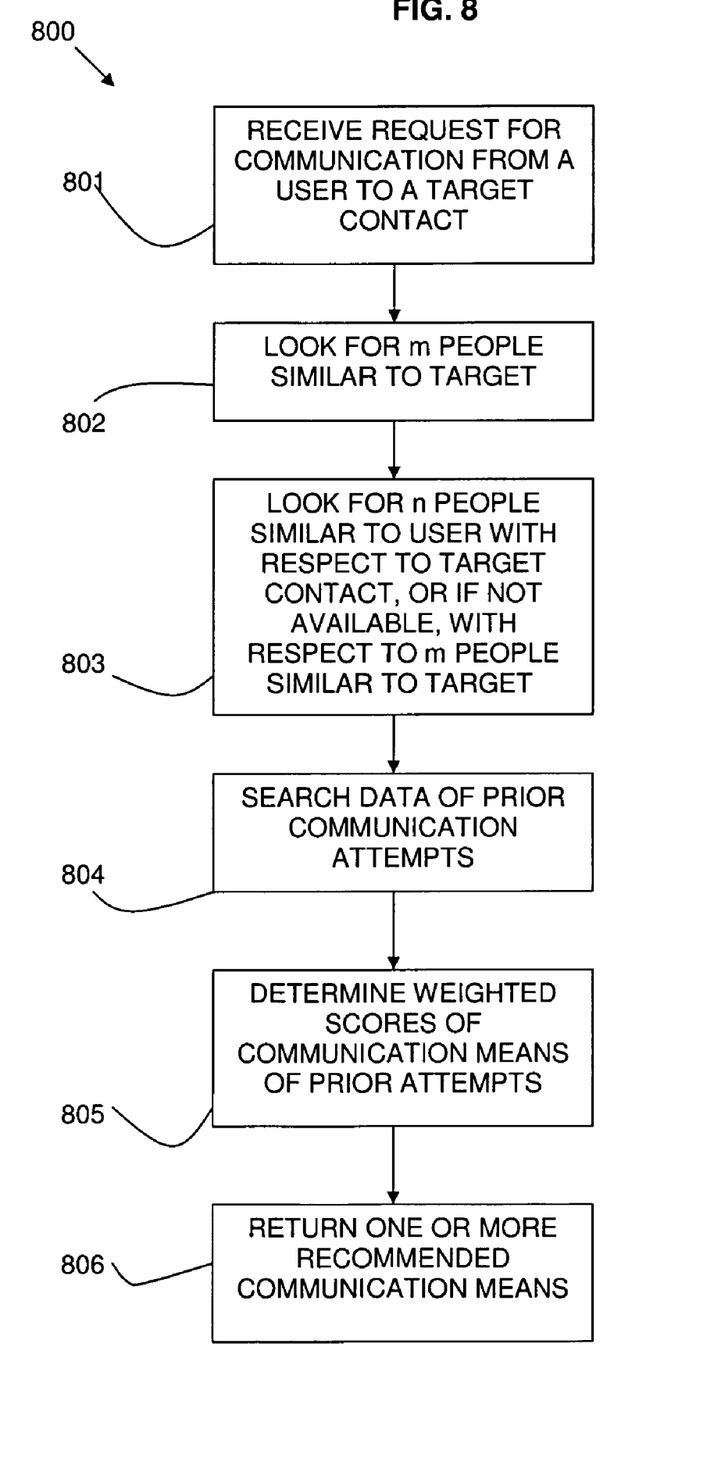
FIG. 8 is a flow diagram of a method in accordance with the present invention.

Referring to FIG. 8, a flow diagram 800 shows the process of the described method. A first user makes a request 801 to the selection system to find a recommended communication means to approach a target contact. The system, optionally, looks 802 for m people similar to the target. The system looks 803 for n people similar to the first user with respect to the target contact, and if these are not available, looks for n people similar to the first user with respect to the m people similar to the target. In an embodiment, an organization chart is used as a main source for locating similarity.

For example, users $u_1$ and $u_2$ may be considered similar with respect to user $u_3$ if they are both at the same number of levels with respect to $U_3$ in the organization chart. Other measures of similarity may include seniority within the organization, organizational unit association, etc.

In an embodiment, the data on prior communication attempts is expanded to communication attempts by users similar to the current user, with one or more prior target contacts which are similar to the current target contacts. For example, a current target contact may have a position in an organizational hierarchy and, if no prior communication data on the actual target contact is available, prior target contacts of a same hierarchy level or category may be analyzed.

The process searches 804 the data of prior communication attempts and determines 805 a weighted average of the efficiency scores of their communication attempts. The system may return 806 a recommended form of communication means to the user or a selection of communication means with weighted scores or ratings for the user to select a communication means.

The described method and system have the advantage of tying or linking the recorded communications' data with preferred communication means. There is also the advantage of using the similarity between users to determine a recommended communication.

A selection system may be provided as a service to a customer over a network. A user may request a recommendation of a communication means by using a service provided over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for selecting communication means, comprising:
   receiving a request by a current user for a recommended communication means for a target contact;
   searching data of prior communication attempts by prior other users with one or more prior target contacts using different communication means, wherein the current user and the prior other users fall within a common first defined category and the target contact and the prior target contacts each fall within one of a plurality of second defined categories, wherein the first defined category and the second defined categories are respective organizational categories selected from the group consisting of an organizational structural level, a department, a group of people having a given relationship to another group of people, and a social network membership;
   respectively determining a success score of the different communication means of the prior communication attempts by the prior other users with ones of the prior target contacts having the same second defined category as the target contact, wherein determining the success score comprises evaluating one or more of a speed of communication response, and a length of communication; and
   selecting the recommended communication means from among the different communication means according to the success score thereof, and providing the recommended communication means for the current user.

2. The method as claimed in claim 1, wherein determining the success score comprises automatically grading efficiencies of the prior communication attempts by determining a weighted average of efficiency scores of the prior communication attempts using the different communication means.

3. The method as claimed in claim 1, including:
   collecting data of prior communication attempts by prior users to prior target contacts by prior user input indicating the success of a communication attempt.

4. The method as claimed in claim 3, wherein the prior user inputs data of prior communication attempts online to be accessible via a network.

5. The method as claimed in claim 1, including: referencing resources via a network to determine defined categories of the current user and target contact.

6. The method as claimed in claim 5, including:
   referencing an organizational structure to determine if prior users or prior target contacts fall within defined organizational categories.

7. The method as claimed in claim 1, wherein providing the recommended communication means includes providing a rated selection of communication means to the current user.

8. The method as claimed in claim 1, wherein the communication means include email, instant messaging (IM), landline telephone, cellular telephone, Internet protocol (IP) telephone, voicemail, short message service (SMS), fax, scheduled meeting.

9. A system for selecting communication means, comprising:
   a processor;
   a memory accessible to the processor storing programs and data objects therein, the programs including a monitoring subsystem and an online records application:
   an interface for receiving a request by a current user for a recommended communication means for a target contact;
   a display; and
   a data analyzer
   wherein the processor is operative to execute the records application cooperatively with the data analyzer to perform the steps of monitoring the request and searching data of prior communication attempts by prior other users with one or more prior target contacts using different communication means, wherein the current user and the prior other users fall within a common first defined category and the target contact and the prior target contacts each fall within one of a plurality of second defined categories, wherein the first defined category and the second defined categories are respective organizational categories selected from the group consisting of an organizational structural level, a department, a group of people having a given relationship to another group of people, and a social network membership, and wherein the data includes a respective indication of success of the different communication means of the prior communication attempts by the prior other users with ones of the prior target contacts having the same second defined category as the target contact;

obtaining the indication of success by evaluating one or more of a speed of communication response, and a length of communication;

selecting the recommended communication means from among the different communication means according to the indication of success thereof and presenting the recommended communication means for the current user on the display.

10. The system as claimed in claim 9, including resources accessible via a network for defining the first defined category and the second defined categories.

11. The system as claimed in claim 9, including:
a data collector for collecting data of prior communication attempts by prior users to prior target contacts by monitoring communication logs; and
a communication attempt evaluator for automatically grading the efficiency of a communication attempt.

12. The system as claimed in claim 11, wherein the data collector includes a monitoring system provided at a client communication means for logging data to a server.

13. The system as claimed in claim 11, wherein the data collector includes a monitoring system provided at a communication server for logging data.

14. The system as claimed in claim 9, including:
a data collector for collecting data of prior communication attempts by prior users to prior target contacts including a user interface for manual input by users indicating the success of a communication attempt.

15. The system as claimed in claim 14, wherein the user interface for manual input by users is an online data input means accessible via a network.

16. The system as claimed in claim 9, wherein the communication means include email, instant messaging (IM), landline telephone, cellular telephone, Internet protocol (IP) telephone, voicemail, short message service (SMS), fax, scheduled meeting.

17. A computer software product for selecting communication means, the product comprising a computer-readable storage medium in which computer-executable instructions are stored, which instructions, when executed by a computer cause the computer to perform the steps of:
receiving a request by a current user for a recommended communication means for a target contact;
searching data of prior communication attempts by prior other users with one or more prior target contacts using different communication means, wherein the current user and the prior other users fall within a common first defined category and the target contact and the prior target contacts each fall within one of a plurality of second defined categories, wherein the first defined category and the second defined categories are respective organizational categories selected from the group consisting of an organizational structural level, a department, a group of people having a given relationship to another group of people, and a social network membership;
respectively determining a success score of the different communication means of the prior communication attempts by the prior other users with ones of the prior target contacts having the same second defined category as the target contact, wherein determining the success score comprises evaluating one or more of a speed of communication response, and a length of communication; and
selecting the recommended communication means from among the different communication means according to the success score thereof, and providing the recommended communication means for the current user.

18. A method of providing a service to a customer over a network, the service comprising:
receiving, via the network a request by the customer for a recommended communication means for a target contact;
searching data of prior communication attempts by prior other users with one or more prior target contacts using different communication means, wherein the customer and the prior other users fall within a common first defined category and the target contact and the prior target contacts fall respectively within one of a plurality of second defined categories, wherein the first defined category and the second defined categories are respective organizational categories selected from the group consisting of an organizational structural level, a department, a group of people having a given relationship to another group of people, and a social network membership;
respectively determining a success score of the different communication means of the prior communication attempts by the prior other users with ones of the prior target contacts having the same second defined category as the target contact, wherein determining the success score comprises evaluating one or more of a speed of communication response, and a length of communication; and
selecting the recommended communication means from among the different communication means according to the success score thereof, and providing the recommended communication means for the customer.

* * * * *